United States Patent [19]

Krupp et al.

[11] Patent Number: 5,634,663
[45] Date of Patent: Jun. 3, 1997

[54] VEHICLE FRAME JOINT

[75] Inventors: Richard Krupp, Bernville; Robert M. Muldowney, Douglassville, both of Pa.

[73] Assignee: Dana Corporation, Toledo, Ohio

[21] Appl. No.: 544,771

[22] Filed: Oct. 18, 1995

[51] Int. Cl.$^6$ ................................................. B62D 21/02
[52] U.S. Cl. ........................... 280/800; 280/781; 296/29
[58] Field of Search ............................... 280/781, 785, 280/800, 799, 795, 796, 797, 798; 296/29, 30, 204

[56] References Cited

U.S. PATENT DOCUMENTS

| 875,254 | 12/1907 | Gartshore | 280/800 |
|---|---|---|---|
| 1,754,926 | 4/1930 | Andren | 280/800 |
| 1,872,485 | 8/1932 | Miller et al. | 280/795 |
| 2,809,050 | 10/1957 | Bauer | 280/795 |
| 2,843,231 | 7/1958 | Maruhn | 280/800 |
| 4,311,744 | 1/1982 | Watanabe | 296/188 |
| 4,593,949 | 6/1986 | Tanimoto | 296/204 |
| 4,763,948 | 8/1988 | Harasaki | 296/194 |
| 5,149,132 | 9/1992 | Ruehl et al. | 280/800 |
| 5,308,115 | 5/1994 | Ruehl et al. | 280/785 |

FOREIGN PATENT DOCUMENTS

| 316287 | 4/1934 | Italy | 280/781 |
|---|---|---|---|
| 2-158461 | 6/1990 | Japan | 280/781 |
| 6-144287 | 5/1994 | Japan | 280/781 |

*Primary Examiner*—Brian L. Johnson
*Assistant Examiner*—Peter C. English
*Attorney, Agent, or Firm*—MacMillan, Sobanski & Todd

[57] ABSTRACT

A joint between a side rail and a cross member in a vehicle frame includes a side rail having a generally closed C-shaped cross section defined by a vertically extending side portion, upper and lower horizontally extending flange portions, and vertically extending lip portions. At the location of the joint, the lip portions are flared away from the vertically extending side portion so as to extend horizontally with the associated flange portions. This permits the cross member to extend in overlapping fashion with and lie adjacent to the flange portions of the side rail. Vertically extending rivets or welds can then be used to secure the cross member to the adjacent overlapping flange portions of the side rail. The preferred cross member includes a cross piece and a gusset connected at each end of the cross piece.

11 Claims, 5 Drawing Sheets

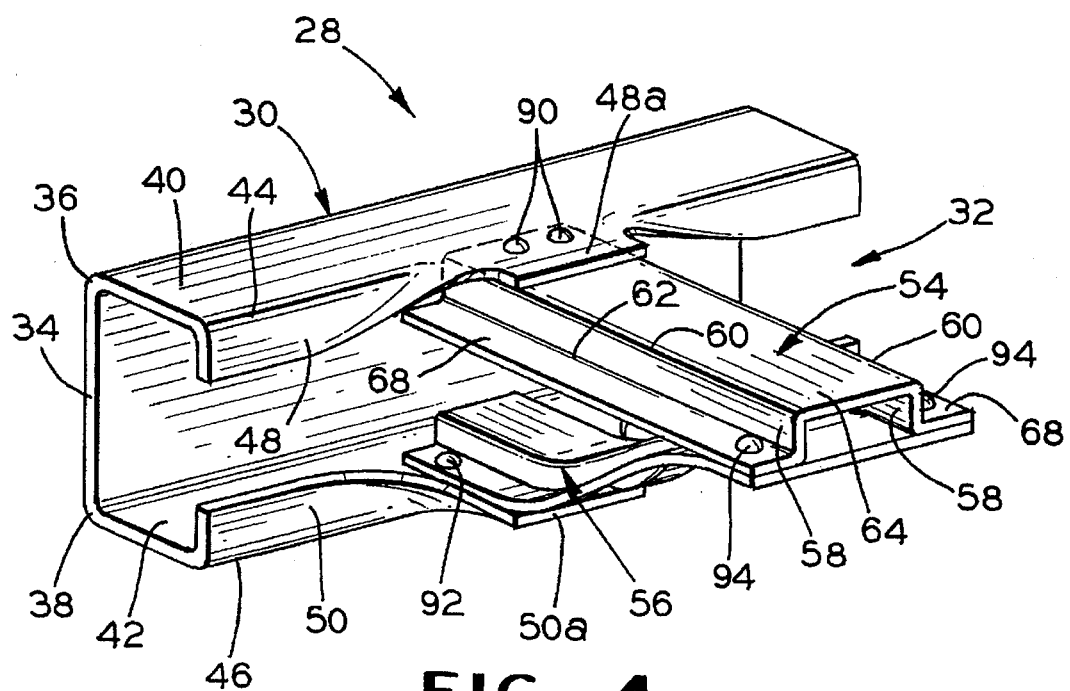
FIG. 4
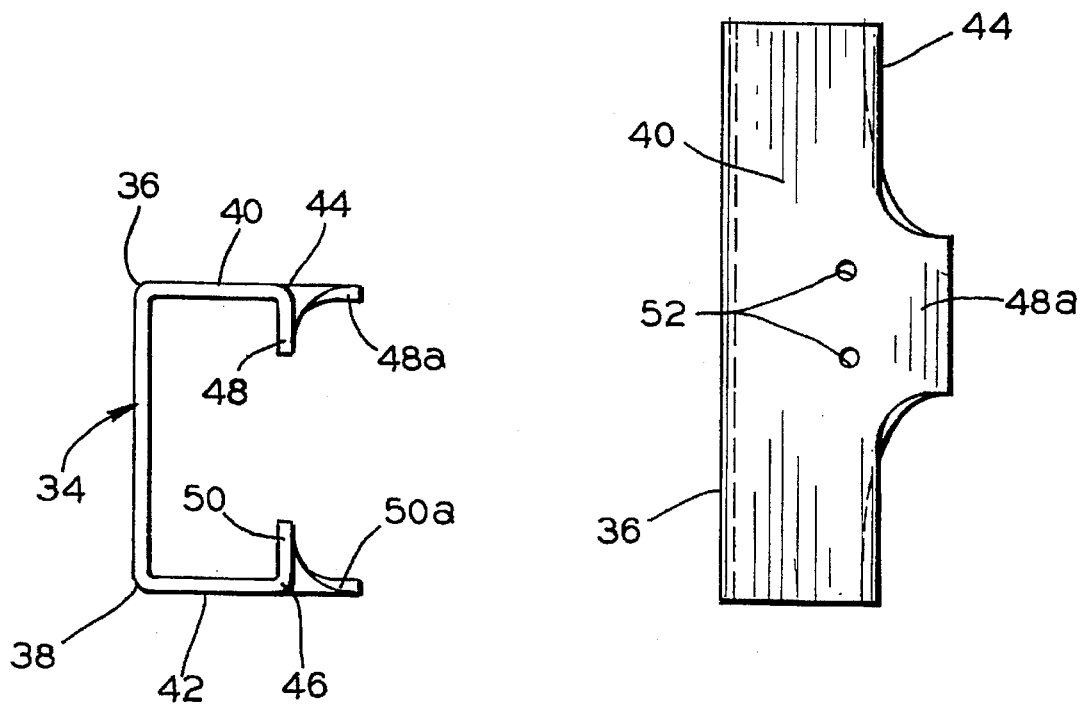
FIG. 5
FIG. 6

VEHICLE FRAME JOINT

BACKGROUND OF THE INVENTION

This invention relates in general to frames for vehicles and in particular to an improved structure for a joint between a side rail and a cross member in a vehicle frame.

A vehicle, such as an automobile or light truck, includes among its major structural components a body, an engine, a drive train, and a suspension system. The vehicle further includes a vehicle frame which serves as a platform for the other components. The body and engine are stacked on top of the vehicle frame, and the drive train and suspension system are hung underneath it.

The vehicle frame typically includes two elongated and parallel side rails having a plurality of cross members extending therebetween to connect them together. The cross members extend generally perpendicular to the side rails and parallel with one another. The connections between the side rails and the cross members of the vehicle frame are known as joints.

A vehicle frame should be strong to support the vehicular components and to maintain its structure in case of a collision. It is also desirable for a vehicle frame to possess a high degree of torsional stiffness or rigidity. The stiffer the frame, the easier it is for a vehicle manufacturer to fine tune the suspension system. A finely tuned suspension system results in significant ride and handling improvements for the vehicle.

In the past, the side rails of a vehicle frame were typically formed having an I-shaped or an open C-shaped cross section. An open C-shaped cross section side rail is defined by a vertically extending side portion and upper and lower horizontally extending flange portions. Side rails of a vehicle frame have also been formed having a closed C-shaped cross section. A closed C-shaped cross section is defined by a vertically extending side portion, upper and lower horizontally extending flange portions, and upper and lower vertically extending lip portions at the ends of the flange portions. It has been found that forming the side rails with a closed C-shaped cross section will increase the torsional stiffness of the side rails. In view of the increased torsional stiffness, it would be desirable to provide a vehicle frame including side rails with a closed C-shaped cross section.

Unfortunately, a closed C-shaped cross section creates difficulties in connecting a cross member to the side rail. When the side rail has an I-shaped or an open C-shaped cross section, a cross member can lie between and adjacent to both the upper and lower horizontally extending flange portions of the side rail. This allows the cross member to be connected to both flange portions to form a stronger and stiffer joint. However, when the side rail has a closed C-shaped cross section, the upper and lower vertically extending lip portions prevent the cross member from lying adjacent to the flange portions. As a result, the cross member cannot be directly connected to the flange portions.

One alternative is to connect the cross member to the vertically extending side portion, instead of the horizontally extending flange portions. However, such a connection weakens and reduces the stiffness of the joint. Another alternative is to form opposing notches in the upper and lower vertically extending lip portions so that the cross member can be positioned therein. This allows the cross member to lie adjacent to the horizontally extending flange portions for connection thereto. However, forming notches in the lip portions also weakens and reduces the stiffness of the joint. Thus, it would be desirable to provide a structure for a vehicle frame joint which includes a side rail having a closed C-shaped cross section and which also forms a strong, stiff joint and vehicle frame.

SUMMARY OF THE INVENTION

This invention relates to an improved structure for a joint between a side rail and a cross member in a vehicle frame. The side rail is formed having a generally closed C-shaped cross section defined by a vertically extending side portion, upper and lower horizontally extending flange portions, and vertically extending lip portions. At the location of the joint, the lip portions are flared away from the vertically extending side portion so as to extend horizontally with the associated upper and lower flange portions. This permits the cross member to extend in overlapping fashion with and lie adjacent to the upper and lower flange portions of the side rail. Vertically extending rivets or welds can then be used to secure the cross member to the adjacent overlapping upper and lower flange portions of the side rail. Preferably, the cross member includes a cross piece and a gusset connected at each end of the cross piece. The improved structure for a joint in accordance with this invention has desirable strength and torsional stiffness which enhances the overall strength and torsional stiffness of the vehicle frame. In particular, the joint has improved torsional performance, uniform performance in vertical beaming, and improved lateral bending performance. The joint is also strong to retain its structure in case of a vehicular collision.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is an enlarged perspective view similar to FIG. 2 illustrating a joint between a side rail and a cross member for a vehicle frame in accordance with this invention.

FIG. 5 is a vertical cross-sectional view of the side rail illustrated in FIG. 4 showing its closed C-shaped cross section and flared lip portions.

FIG. 6 is a top plan view of the side rail of FIG. 4 showing its flared lip portion and apertures.

DETAILED DESCRIPTION OF THE PREFERRED EMBODIMENT

Figure 1:
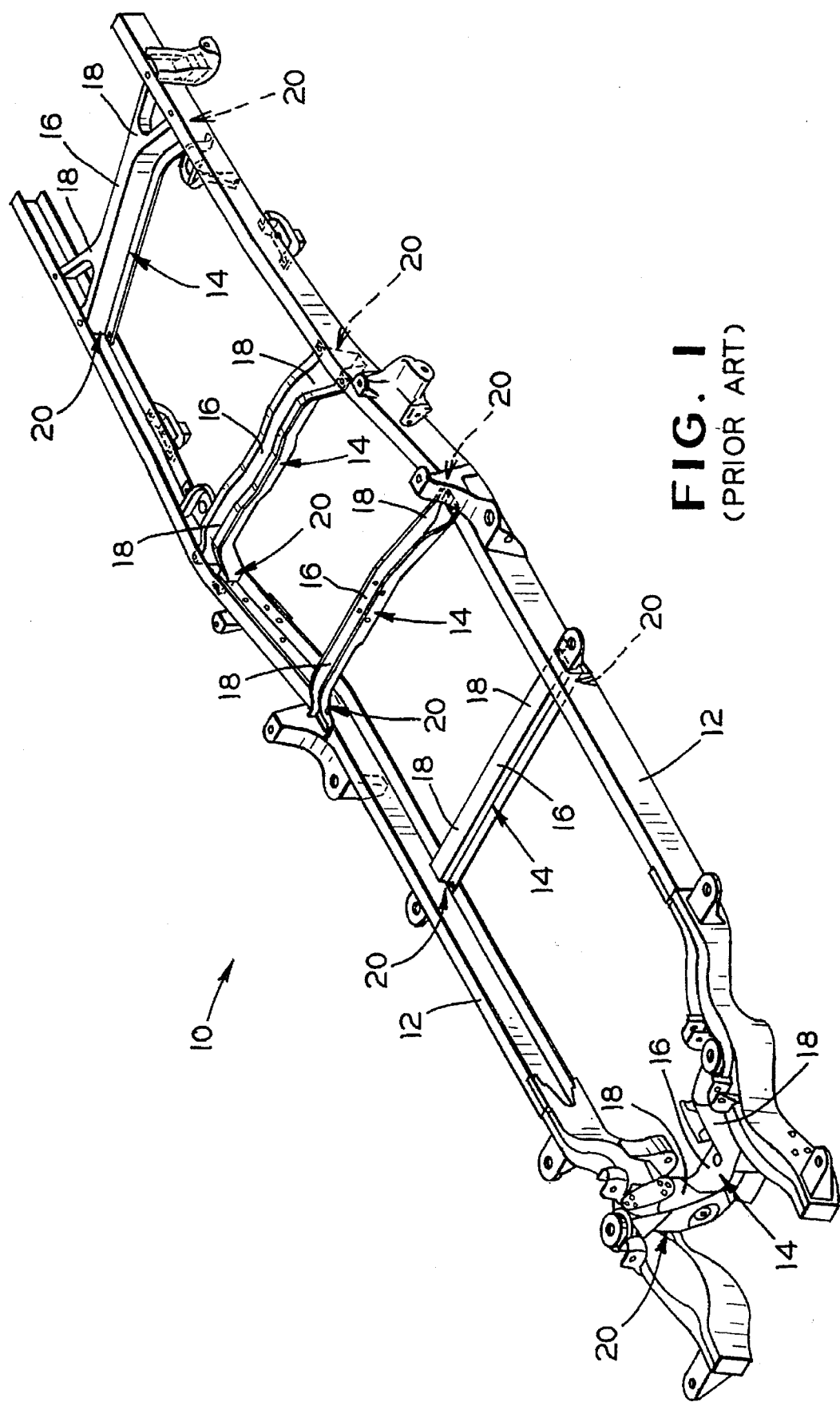
FIG. 1 is a perspective view of a prior art vehicle frame including two side rails and five cross members.

Referring now to the drawings, there is illustrated in FIG. 1 a prior art vehicle frame, indicated generally at 10. The vehicle frame 10 includes two side rails 12 which are spaced apart and extend generally parallel with one another. Each side rail 12 is generally in the shape of an elongated beam. Five cross members 14 extend between the side rails 12 to connect them together. Each cross member 14 is generally in the shape of a beam which is relatively shorter than a side rail 12. The cross members 14 are spaced apart and extend generally perpendicular to the side rails 12 and generally parallel with one another. Each cross member 14 includes a center portion 16 and a pair of end portions 18. Each end portion 18 of the cross member 14 is connected to a side rail 12 at a vehicle frame joint, illustrated generally at 20. The illustrated vehicle frame 10, therefore, includes ten of such joints 20.

Figure 2:
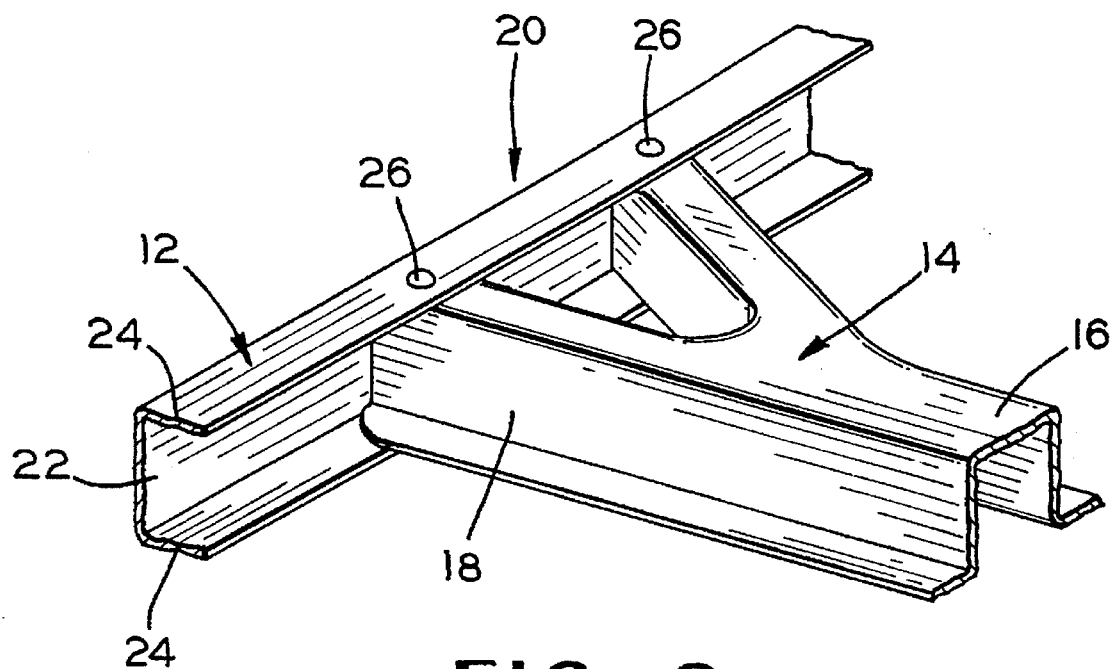
FIG. 2 is an enlarged perspective view of one of the joints between a side rail and a cross member in the vehicle frame illustrated in FIG. 1.
Figure 3:
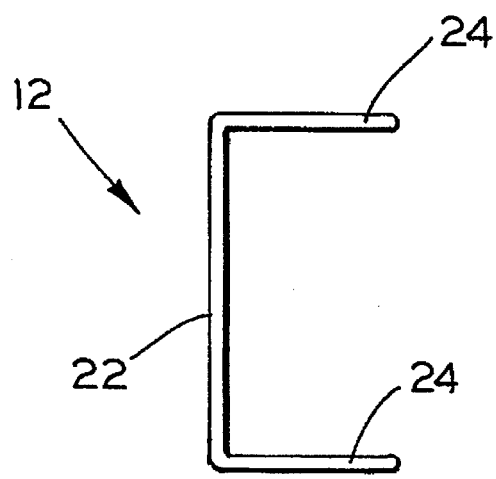
FIG. 3 is a vertical cross-sectional view of the side rail illustrated in FIGS. 1 and 2 showing its open C-shaped cross section.

FIG. 2 illustrates in detail one of the joints 20 between a side rail 12 and a cross member 14 of the vehicle frame 10 of FIG. 1. As shown therein (and more clearly in FIG. 3), the side rail 12 has an open C-shaped cross section, including a vertically extending side portion 22 and upper and lower horizontally extending flange portions 24. The illustrated end portion 18 of the cross member 14 is split into two legs, each of which is connected to the side rail 12 at the joint 20. The legs of the end portion 18 of the cross member 14 extend between and adjacent to both the upper and lower horizontally extending flange portions 24 of the side rail 12. This allows the cross member 14 to be connected to both flange portions 24, such as by rivets 26 (shown only in the upper flange portion 24).

Referring now to FIGS. 4, 5, and 6, there is illustrated a portion of a vehicle frame including an improved structure for a vehicle frame joint in accordance with this invention. The joint, indicated generally at 28, is formed at the connection between a side rail, indicated generally at 30, and a cross member, indicated generally at 32. As best shown in FIGS. 4 and 5, the side rail 30 has a generally closed C-shaped vertical cross sectional shape, including a vertically extending side portion 34 defining an upper edge 36 and a lower edge 38. An upper flange portion 40 extends horizontally from the upper edge 36 of the side portion 34. Similarly, a lower flange portion 42 extends horizontally from the lower edge 38 of the side portion 34. The upper and lower flange portions 40 and 42 extend generally perpendicular to the side portion 34 and generally parallel with one another. The upper flange portion 40 terminates at an inner edge 44, while the lower flange portion terminates at an inner edge 46.

The upper flange portion 40 includes an upper lip portion 48 which extends from the inner edge 44, while the lower flange portion 42 includes a lower lip portion 50 which extends from the inner edge 46. Throughout most of the length of the side rail 30, the upper lip portion 48 extends generally downwardly from the upper flange 40 so as to be oriented perpendicular to the upper flange 40 and parallel to the vertical flange 34. Similarly, throughout most of the length of the side rail 30, the lower lip portion 50 extends generally upwardly from the lower flange 42 so as to be oriented perpendicular to the lower flange 42 and parallel to the vertical flange 34. In the illustrated embodiment, the upper and lower lip portions 48 and 50 are co-planar, although such is not necessary. At the location of the joint 28 between the side rail 30 and the cross member 32, however, portions 48a and 50a of the upper and lower lip portions 48 and 50 are flared outwardly away from the vertical flange 34 so as to extend generally parallel with one another, co-planar with the respective upper and lower flange portions 40 and 42. More specifically, at the location of the joint 28, the portion 48a of the upper lip portion 48 extends horizontally from and continuously with the inner edge 44 of the upper flange portion 40, while the portion 50a of the lower lip portion 50 extends horizontally from and continuous with the inner edge 46 of the lower flange portion 42. The side portion 34, the upper and lower flange portions 40 and 42, and lip portions 48 and 50 are preferably formed integrally with one another as a single piece of formed metal. However, they can also be separate pieces.

A plurality of apertures 52 are formed through the side rail 30 at the location of the joint 28. As shown in FIG. 6, two apertures 52 are formed through the upper flange portion 40, while two similar apertures (not shown) are formed through the lower flange portion 42. The apertures 52 formed through the upper flange portion 40 are vertically aligned with the apertures 52 formed through the lower flange portion 42. The purpose for these apertures 52 will be explained below.

Figure 7:
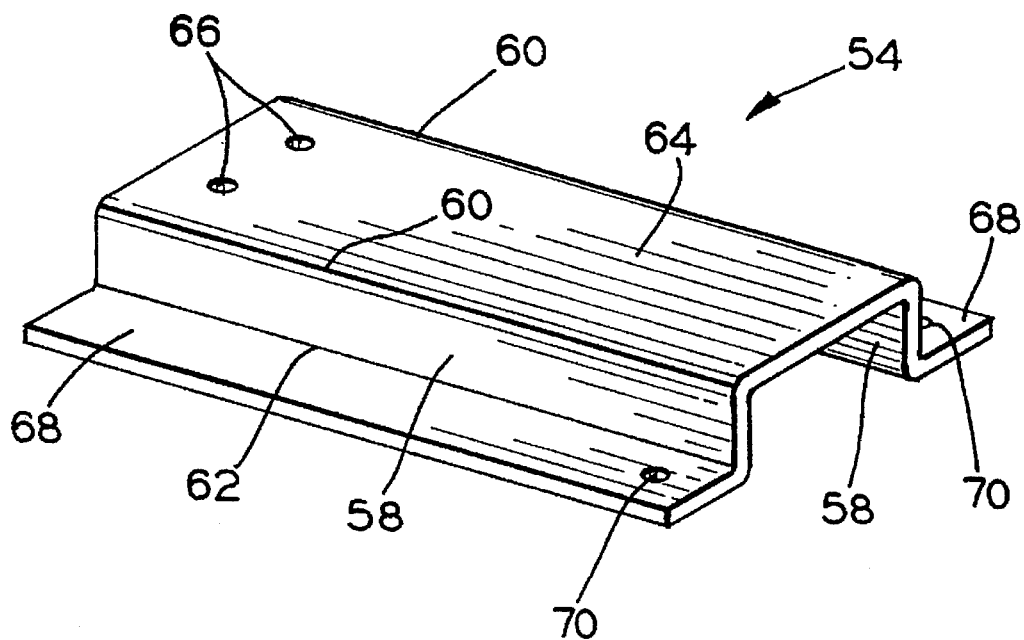
FIG. 7 is an enlarged perspective view of the upper cross piece of the cross member illustrated in FIG. 4.

Referring back to FIG. 4, it can be seen that an upper cross piece, indicated generally at 54, and a lower gusset, indicated generally at 56, are provided for connecting one end of the cross member 32 to the side rail 30. A similar upper cross piece and lower gusset member (not shown) are provided for connecting the other end of the cross member 32 to the other side rail (not shown). As shown in FIGS. 4 and 7, the upper cross piece 54 has a generally hat-shaped vertical cross section when viewed along the longitudinal axis. More specifically, the upper cross piece 54 includes two vertically extending side portions 58 which are spaced apart and generally parallel with one another. Each side portion 58 includes an upper edge 60 and a lower edge 62. A horizontally extending upper portion 64 extends between the upper edges 60 of the two side portions 58, generally perpendicular to the side portions 58. A pair of apertures 66 are formed through the upper portion 64. A lower horizontal flange portion 68 extends outwardly from the lower edge 62 of each side portion 58. The lower flange portions 68 extend generally perpendicular to the side portions 58 and are generally co-planar with one another. An aperture 70 is formed through each of the flange portions 68.

Figure 8:
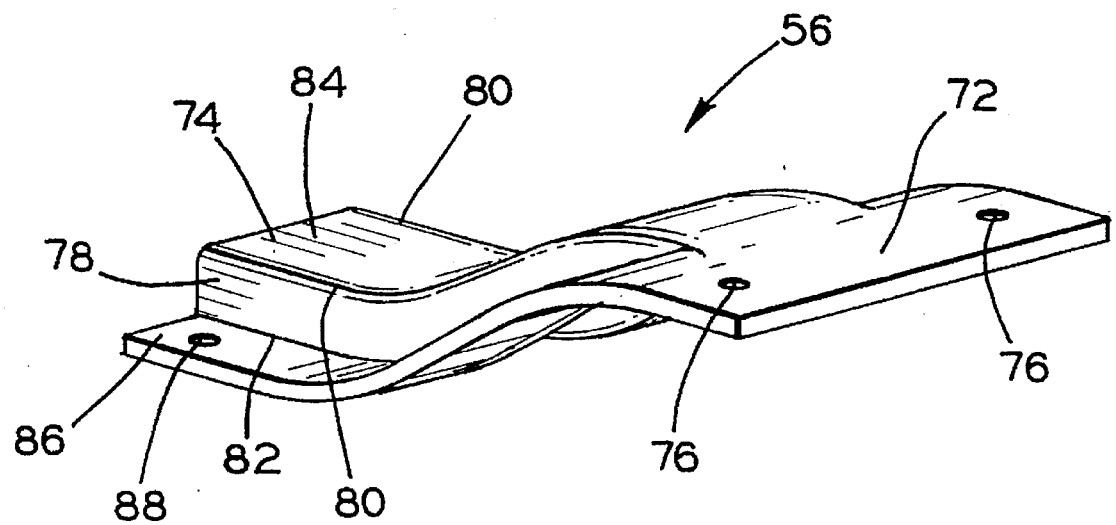
FIG. 8 is an enlarged perspective view of the lower gusset of the cross member illustrated in FIG. 4.

The lower gusset 56 is positioned below the upper cross piece 54. As best illustrated in FIG. 8, the lower gusset 56 includes an upper portion 72 and a lower portion 74. The upper portion 72 is formed generally in the shape of a horizontally extending plate. A pair of apertures 76 are formed through the upper portion 72. The apertures 76 formed through the upper portion 72 of the gusset 56 are sized and positioned to be aligned with the apertures 70 formed through the flange portions 68 of the cross piece 54 when the two members are assembled as shown in FIG. 4. The lower gusset 56 extends downward in a curved fashion from the upper portion 72 to the lower portion 74 such that, when viewed from the side, the lower gusset 56 appears somewhat S-shaped. The lower portion 74 has a generally hat-shaped vertical cross section when viewed along the longitudinal axis, similar to the hat-shaped cross section of the upper cross piece 54. Specifically, the lower portion 74 of the lower gusset 56 includes two vertically extending side portions 78 (only one of which is shown). The side portions 78 are spaced apart and generally parallel with one another. Each side portion 78 includes an upper edge 80 and a lower edge 82. A horizontally extending upper portion 84 extends between the upper edges 80 of the two side portions 78, generally perpendicular to the side portions 78. A lower horizontal flange portion 86 (only one of which is shown) extends outwardly from the lower edge 82 of each side portion 78. The flange portions 86 extend generally perpendicular to the side portions 78 and generally co-planar with one another. An aperture 88 is formed through each of the flange portions 86. The apertures 88 are sized and positioned to be aligned with the apertures 52 in the lower flange portion 42 of the side rail 30.

As illustrated in FIG. 4, the joint 28 is formed by orienting the upper cross piece 54 and the lower gusset member 56 of the cross member 32 within the side rail 30. As discussed above, at the location of the joint 28, the upper lip portion 48a of the side rail 30 is flared away from the vertically extending side portion 34 so that the upper lip portion 48a extends horizontally from the upper flange portion 40. This permits the horizontally extending upper cross piece 54 of the cross member 32 to extend in overlapping fashion with the upper flange portion 40 of the side rail 30. The horizontally extending upper portion 64 of the upper cross piece 54 thus extends parallel with and adjacent to the lower surface of the upper flange portion 40 of the side rail 30. The apertures 66 formed through the upper portion 64 of the upper cross piece 54 can be aligned with the apertures 52, formed through the upper flange portion 40 of the side rail 30. A pair of rivets 90 can then be inserted through the apertures 52 and 66 to secure the upper portion 64 of the upper cross piece 54 to the upper flange portion 40 of the side rail 30.

Similarly, the lower lip portion 50a of the side rail 30 is flared away from the vertically extending side portion 34 so that the lower lip portion 50a extends horizontally from the lower flange portion 42. This permits the horizontally extending lower flange portions 86 of the lower gusset 56 of the cross member 32 to extend in overlapping fashion with the lower flange portion 42 of the side rail 30. The flange portions 86 of the lower gusset 56 thus extend parallel with and adjacent to the lower flange portion 42 of the side rail 30. The apertures 88 formed through the flange portions 86 of the lower gusset 56 are aligned with the apertures 52 formed through the lower flange portion 42 of the side rail 30. A pair of rivets 92 (only one of which is shown) can then be inserted through the apertures 52 and 88 to secure the flange portions 86 of the lower gusset 56 to the lower flange portion 42 of the side rail 30.

The horizontally extending plate-shaped upper portion 72 of the lower gusset 56 extends parallel and adjacent to the two horizontally extending flange portions 68 of the upper cross piece 54. The apertures 76 formed through the upper portion 72 of the gusset 56 are aligned with the apertures 70 formed through the flange portions 68 of the cross piece 54. A pair of rivets 94 are inserted through the apertures 70 and 76 to secure the upper portion 72 of the lower gusset 56 to the flange portions 68 of the upper cross piece 54.

Figure 9:
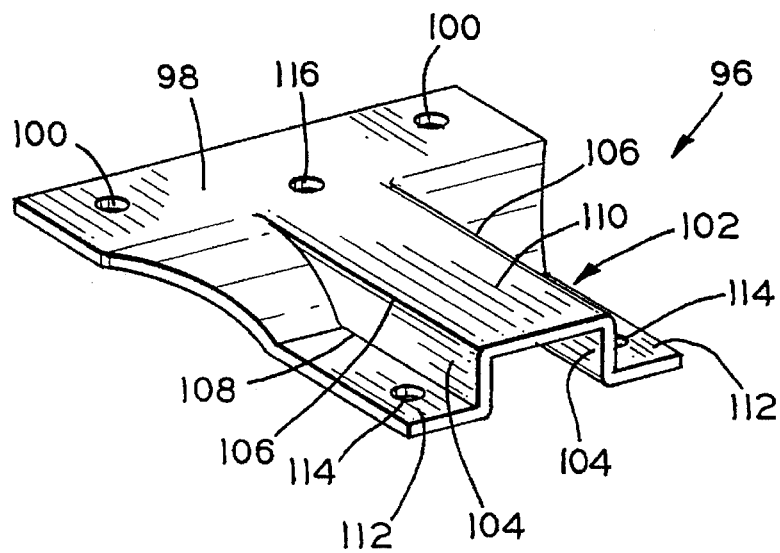
FIG. 9 is an enlarged perspective view similar to FIG. 7 of a first alternate embodiment of the upper cross piece.

Referring now to FIG. 9, there is illustrated a first alternate embodiment of an upper cross piece, indicated generally at 96, for the cross member 32 in accordance with this invention. The upper cross piece 96 includes a horizontally extending, generally rectangular plate-shaped end portion 98. A pair of apertures 100 are formed through the end portion 98. The upper cross piece 96 further includes a center portion 102 having a generally hat-shaped vertical cross section when viewed along the longitudinal axis. Specifically, the center portion 102 of the cross piece 96 includes two vertically extending side portions 104. The side portions 104 are spaced apart and generally parallel with one another. Each side portion 104 includes an upper edge 106 and a lower edge 108. A horizontally extending upper portion 110 extends between the upper edges 106 of the two side portions 104, generally perpendicular to the side portions 104. A lower horizontal flange portion 112 extends outwardly from the lower edge 108 of each side portion 104.

The flange portions 112 extend generally perpendicular to the side portions 104, co-planar with one another. An aperture 114 is formed through each of the flange portions 112.

The upper portion 110 of the center portion 102 of the alternate upper cross piece 96 extends co-planar and continuous with the end portion 98 of the cross piece, and an aperture 116 is formed therethrough at a central location. The apertures 100, 114, and 116 are sized and positioned to permit rivets (not shown) to connect the cross piece 96 to a gusset and the side rail 30, as discussed above. The flange portions 112 of the center portion 102 extend parallel with and below the end portion 98 of the cross piece 96. The center portion 102 is also narrower than the end portion 98. Each of the flange portions 112 widens and extends upwardly to connect continuously with the end portion 98.

Figure 10:
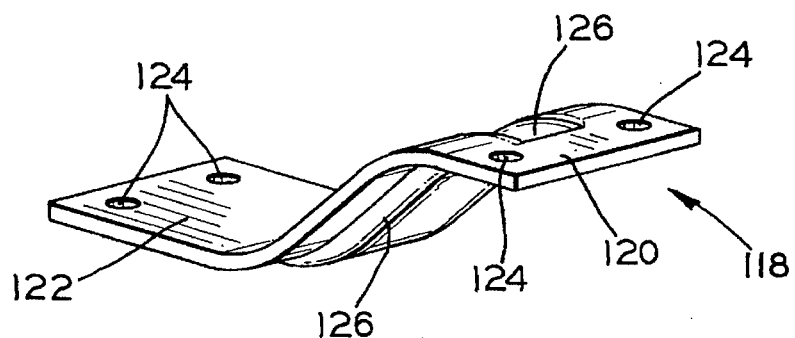
FIG. 10 is an enlarged perspective view similar to FIG. 8 of a first alternate embodiment of the gusset.

FIG. 10 illustrates a first alternate embodiment of a lower gusset, indicated generally at 118, for the cross member 32 in accordance with this invention. The lower gusset 118 is generally in the form of a plate which is gradually curved so that it appears somewhat S-shaped when viewed from the side. When viewed from above, the lower gusset 118 appears generally rectangular in shape. The lower gusset 118 includes a horizontally extending upper portion 120 and a horizontally extending lower portion 122. A pair of apertures 124 are formed through each of the upper portion 120 and lower portion 122. The apertures 124 are sized and positioned to permit rivets (not shown) to connect the lower gusset 118 to the upper cross piece 54 and the side rail 30, as discussed above. A groove 126 is formed through the center of the lower gusset 118 between the upper portion 120 and the lower portion 122 to increase the stiffness thereof.

Figure 11:
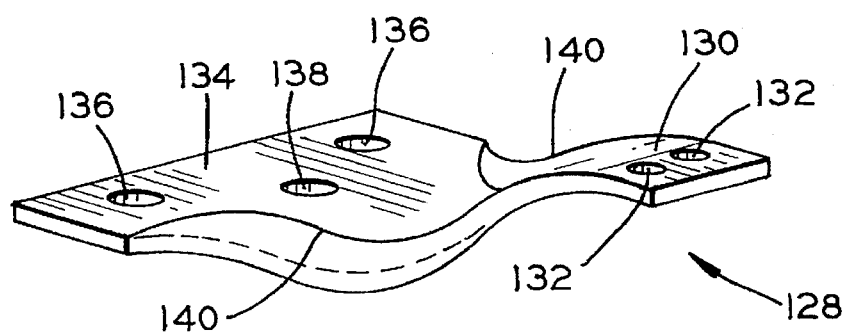
FIG. 11 is an enlarged perspective view similar to FIG. 8 of a second alternate embodiment of the gusset.

FIG. 11 illustrates a second alternate embodiment of a lower gusset, indicated generally at 128, for the cross member 32 in accordance with this invention. The lower gusset 128 includes a horizontally extending upper portion 130 having a pair of apertures 132 formed therethrough. The lower gusset 128 further includes a generally rectangular plate-shaped lower portion 134. A pair of apertures 136 are formed through the lower portion 134. The lower portion 134 is wider than the upper portion 130. The gusset 128 widens and gradually curves downward between the upper portion 130 and the lower portion 134 so that it appears somewhat S-shaped when viewed from the side. An aperture 138 is formed between the upper portion 130 and the lower portion 134. The apertures 132, 136, and 138 are sized and positioned to permit rivets (not shown) to connect the gusset 128 to the upper cross piece 54 and the side rail 30, as discussed above. A pair of ridges 140 extend between the upper portion 130 and the lower portion 134 along the sides of the gusset 128 to increase the stiffness thereof.

While the invention has been illustrated with the use of rivets, any suitable means can be used for securing the cross member 32 to the side rail 30, and the upper cross piece 54 to the lower gusset 56 of the cross member 32. Preferred means include rivets or welds, but bolts or physical deformation of the structures such as staking could also be used. Any suitable number of apertures can be used. The upper cross piece 54 and the lower gusset 56 of the illustrated cross member 32 are separate pieces. However, the lower gusset 56 can also be formed integrally with the upper cross piece 54 to form a single-piece cross member.

In the preferred embodiment, the upper cross piece 54 is secured to the upper flange portion 40, while the lower gusset 56 is secured to the lower flange portion 42. However, the positioning of these structures can also be reversed.

While the side rails 30 have been illustrated as one-piece side rails, two-piece side rails can also be employed in the invention. If a two-piece side rail is used, the joint between the cross member and the side rails can be at the same location as the joint between the side rails, or the joints can be at different locations. The side rails and cross members of the vehicle frame are typically formed from steel, although other metals and alloys and other materials can also be used. Lastly, although the invention has been described using the terms "horizontal" and "vertical" in the interest of clarity, it will be appreciated that such terms are relative to one another and are not intended to limit the scope of the claimed invention to a particular direction or orientation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A joint between a side rail and a cross member in a vehicle frame comprising:
   a side rail having a generally C-shaped cross section defined by a vertically extending side portion, upper and lower horizontally extending flange portions extending from said side portion, and upper and lower vertically extending lip portions extending respectively from said flange portions, said upper and lower lip portions being flared away from said side portion at said joint so as to extend horizontally with said upper and lower flange portions, respectively;
   a cross member including a horizontally extending upper end portion having a generally hat-shaped cross section defined by a horizontally extending top portion, a pair of vertically extending side portions extending from said top portion, and a pair of horizontally extending flange portions extending respectively from said side portions, wherein said top portion of said upper end portion of said cross member abuts said upper flange portion and said upper flared lip portion of said side rail in overlapping fashion, said cross member further including a horizontally extending lower end portion having a generally hat-shaped cross section defined by a horizontally extending top portion, a pair of vertically extending side portions extending from said top portion, and a pair of horizontally extending flange portions extending respectively from said side portions, wherein said flange portions of said lower end portion of said cross member abut said lower flange portion and said lower flared lip portion of said side rail in overlapping fashion;
   means for securing said top portion of said upper end portion of said cross member to said upper flange portion and said upper flared lip portion of said side rail; and
   means for securing said flange portions of said lower end portion of said cross member to said lower flange portion and said lower flared lip portion of said side rail.

2. The joint defined in claim 1 wherein said horizontally extending upper end portion of said cross member includes an upper cross piece having a generally hat-shaped cross section which is secured between said cross member and said side rail.

3. The joint defined in claim 1 wherein said horizontally extending lower end portion of said cross member includes a gusset having a generally hat-shaped cross section which is secured between said cross member and said side rail.

4. The joint defined in claim 1 wherein said horizontally extending upper end portion of said cross member includes an upper cross piece having a generally hat-shaped cross section which is secured between said cross member and said side rail, and wherein said horizontally extending lower end portion of said cross member includes a gusset having a generally hat-shaped cross section which is secured between said cross member and said side rail.

5. The joint defined in claim 1 wherein said top portion of said upper end portion of said cross member abuts a lower surface of said upper flange portion and said upper flared lip portion of said side rail in overlapping fashion.

6. The joint defined in claim 1 wherein said flange portions of said lower end portion of said cross member abut an upper surface of said lower flange portion and said lower flared lip portion of said side rail in overlapping fashion.

7. The joint defined in claim 1 wherein said top portion of said upper end portion of said cross member abuts a lower surface of said upper flange portion and said upper flared lip portion of said side rail in overlapping fashion, and wherein said flange portions of said lower end portion of said cross member abut an upper surface of said lower flange portion and said lower flared lip portion of said side rail in overlapping fashion.

8. The joint defined in claim 1 wherein said means for securing said top portion of said upper end portion of said cross member to said upper flange portion and said upper flared lip portion of said side rail includes a rivet.

9. The joint defined in claim 1 wherein said means for securing said flange portions of said lower end portion of said cross member to said lower flange portion and said lower flared lip portion of said side rail includes a rivet.

10. The joint defined in claim 1 wherein said means for securing said top portion of said upper end portion of said cross member to said upper flange portion and said upper flared lip portion of said side rail includes a plurality of rivets, and wherein said means for securing said flange portions of said lower end portion of said cross member to said lower flange portion and said lower flared lip portion of said side rail includes a plurality of rivets.

11. The joint defined in claim 1 wherein said upper end portion of said cross member and said lower end portion of said cross member are secured together by a rivet.

* * * * *